US011519816B2

(12) United States Patent
Ihn et al.

(10) Patent No.: US 11,519,816 B2
(45) Date of Patent: Dec. 6, 2022

(54) COMPOSITE PLY-BY-PLY DAMAGE ASSESSMENT USING CORRELATION FACTORS BETWEEN FINITE ELEMENT MODELS (FEMS) AND NON-DESTRUCTIVE EVALUATIONS (NDES)

(71) Applicant: The Boeing Company, Chicago, IL (US)

(72) Inventors: Jeong-Beom Ihn, Bellevue, WA (US); Mostafa Rassaian, Bellevue, WA (US); Kenneth Hunziker, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 897 days.

(21) Appl. No.: 16/278,362

(22) Filed: Feb. 18, 2019

(65) Prior Publication Data

US 2020/0264071 A1    Aug. 20, 2020

(51) Int. Cl.
| | |
|---|---|
| *G01M 5/00* | (2006.01) |
| *B64F 5/60* | (2017.01) |
| *G06F 30/23* | (2020.01) |
| *G06F 113/26* | (2020.01) |
| *G06F 16/901* | (2019.01) |

(52) U.S. Cl.
CPC ............. *G01M 5/0033* (2013.01); *B64F 5/60* (2017.01); *G06F 30/23* (2020.01); *G06F 16/9024* (2019.01); *G06F 2113/26* (2020.01); *G06F 2213/24* (2013.01)

(58) Field of Classification Search
CPC .. G01M 5/0033; G06F 30/23; G06F 16/9024; G06F 2213/26; G06F 2213/24; B64F 5/60
See application file for complete search history.

(56) References Cited

U.S. PATENT DOCUMENTS

| | | | |
|---|---|---|---|
| 5,692,086 A | 11/1997 | Beranek et al. |
| 6,363,789 B1 | 4/2002 | Rassaian et al. |
| 6,813,749 B2 | 11/2004 | Rassaian |
| 6,925,869 B2 | 8/2005 | Senibi et al. |
| 7,430,499 B2 | 9/2008 | Rassaian et al. |
| 7,438,263 B2 | 10/2008 | Rassaian et al. |
| 7,552,027 B2 | 6/2009 | Kearns et al. |
| 7,558,639 B2 | 7/2009 | Rassaian et al. |
| 7,623,994 B2 | 11/2009 | Rassaian et al. |
| 7,822,573 B2 | 10/2010 | Ihn |
| 7,840,386 B2 | 11/2010 | Rassaian et al. |
| 7,891,247 B2 | 2/2011 | Ihn |
| 7,925,455 B2 | 4/2011 | Pado et al. |
| 7,925,475 B2 | 4/2011 | Rassaian et al. |
| 7,937,248 B2 | 5/2011 | Ihn et al. |
| 7,991,587 B2 | 8/2011 | Ihn |
| 8,015,877 B2 | 9/2011 | Ihn |
| 8,042,397 B2 | 10/2011 | Ihn |
| 8,055,455 B2 | 11/2011 | Ihn et al. |

(Continued)

*Primary Examiner* — Jonathan M Dunlap
(74) *Attorney, Agent, or Firm* — Coats & Bennett, PLLC

(57) ABSTRACT

A computer is configured to enable a rapid, consistent, ply-by-ply, quantitative analytical assessment of various Finite Element Method (FEM) material models based on metrics defined for impact damage. Additionally, the computer is configured to provide a method for determining the accuracy of such FEM material model(s) by comparing the output of those models to non-destructive evaluation (NDE) test data.

20 Claims, 12 Drawing Sheets

(56) References Cited

U.S. PATENT DOCUMENTS

| | | |
|---|---|---|
| 8,180,607 B2 | 5/2012 | Rassaian et al. |
| 8,286,492 B2 | 10/2012 | Sohn et al. |
| 8,290,719 B2 | 10/2012 | Ihn et al. |
| 8,376,275 B2 | 2/2013 | Bolukbasi et al. |
| 8,412,490 B2 | 4/2013 | Dunne et al. |
| 8,499,632 B1 | 8/2013 | Ihn et al. |
| 8,511,034 B2 | 8/2013 | Gregg et al. |
| 8,528,874 B2 | 9/2013 | Gregg et al. |
| 8,544,328 B2 | 10/2013 | Sohn et al. |
| 8,694,269 B2 | 4/2014 | Mathews et al. |
| 8,707,787 B1 | 4/2014 | Sohn et al. |
| 8,714,226 B2 | 5/2014 | Senibi et al. |
| 8,745,864 B2 | 6/2014 | Kessler et al. |
| 8,756,037 B2 | 6/2014 | Rassaian et al. |
| 8,812,251 B2 | 8/2014 | Ihn et al. |
| 8,862,437 B1 | 10/2014 | Rassaian et al. |
| 8,930,042 B2 | 1/2015 | Jang et al. |
| 9,020,786 B2 | 4/2015 | Rassaian et al. |
| 9,038,469 B2 | 5/2015 | Sohn et al. |
| 9,107,325 B1 | 8/2015 | Ihn et al. |
| 9,267,906 B2 | 2/2016 | Anway et al. |
| 9,417,213 B1 | 8/2016 | Ihn |
| 9,470,660 B2 | 10/2016 | Dunne et al. |
| 9,480,163 B2 | 10/2016 | Kessler et al. |
| 9,506,836 B2 | 11/2016 | Pado et al. |
| 9,567,104 B2 | 2/2017 | Sweers et al. |
| 9,665,976 B2 | 5/2017 | Rassaian et al. |
| 9,770,873 B2 | 9/2017 | Gilbert et al. |
| 10,095,818 B2 | 10/2018 | Rassaian et al. |
| 10,140,388 B1 | 11/2018 | Rassaian et al. |
| 10,183,449 B2 | 1/2019 | Rassaian et al. |
| 10,195,817 B2 | 2/2019 | Balabanov et al. |
| 10,502,719 B2 * | 12/2019 | Tat ............................ G06F 30/23 |
| 2010/0250148 A1 * | 9/2010 | Meredith ............. G01M 5/0033 <br> 702/34 |
| 2014/0278292 A1 * | 9/2014 | Grellou ................ G01N 29/265 <br> 703/2 |

\* cited by examiner

| | MODEL INPUTS | | | | | | MODEL OUTPUTS | | |
|---|---|---|---|---|---|---|---|---|---|
| LAYER | MAJOR FEM1 | MINOR FEM1 | ORIENTATION FEM1 | MAJOR FEM2 | MINOR FEM2 | ORIENTATION FEM2 | MAJOR TRUTH | MINOR TRUTH | ORIENTATION TRUTH |
| 1 | 24.86 | 6.78 | 1.61 | 3.68 | 2.79 | 0.28 | 5.52 | 3.59 | 1.66 |
| 2 | 24.96 | 7.72 | 1.61 | 5.08 | 3.97 | 0.25 | 5.92 | 4.83 | 1.86 |
| 3 | 24.93 | 8.00 | 1.59 | 3.41 | 2.96 | 2.83 | 5.90 | 4.80 | 1.81 |
| 4 | 25.07 | 8.32 | 1.49 | 5.74 | 5.04 | 1.31 | 6.12 | 5.07 | 1.51 |
| 5 | 24.99 | 9.48 | 1.57 | 3.50 | 2.85 | 2.64 | 6.80 | 5.22 | 1.52 |
| 6 | 24.96 | 7.97 | 1.54 | 7.65 | 7.24 | 2.11 | 6.73 | 5.34 | 1.82 |

FIG. 8

COMPOSITE PLY-BY-PLY DAMAGE ASSESSMENT USING CORRELATION FACTORS BETWEEN FINITE ELEMENT MODELS (FEMS) AND NON-DESTRUCTIVE EVALUATIONS (NDES)

TECHNICAL FIELD

The present disclosure relates generally to computer devices, and particularly to computer devices configured to predict impact damage of a multi-ply composite structure.

BACKGROUND

Finite element analysis is an important tool for engineers when predicting damage states for composite materials, such as multi-ply composite panels and/or other composite structures, for example. One particularly beneficial aspect is that finite element analysis allows engineers to make their predictions in a non-destructive manner (i.e., without having to actually disturb a sample of a composite material as part of the analysis process). Thus, the use of finite element analysis in the prediction of damage states provides a cost-effective method in which to design and build safer vehicles, such as airplanes, for example.

However, damage state prediction using nonlinear explicit finite element analysis is complex. Particularly, conventional analysis methods utilize multiple different finite element method (FEM) models to predict damage to composite materials. Each FEM model is unique, and therefore, each yields a different model of a physical response. Currently, there is no standard process for adopting the results of these multiple models and utilizing them for such things as cross-validation and improving prediction fidelities. Further, conventional computational methods require engineers to visually compare the results of the different FEM models to one or more scan images obtained using a non-destructive evaluation (NDE) method.

BRIEF SUMMARY

Aspects of the present disclosure relate to an apparatus, a corresponding method, and a corresponding non-transitory computer-readable medium that configure a computer to perform a ply-by-ply composite damage assessment and damage quantification of a multi-ply composite structure (e.g., a multi-ply composite panel).

In one aspect, a computer configured to determine impact damage of a projectile on a multi-ply composite structure comprises a communication interface circuit and processing circuitry operatively connected to the communication interface circuit. The communication interface circuit is configured to communicate data via a communications network. The processing circuitry, which is operatively connected to the communication interface circuit, is configured to generate a plurality of weighting factors for the multi-ply composite structure, wherein each weighting factor correlates a predicted damage value representing a predicted amount of impact damage to a ply of the multi-ply composite structure to an actual damage value representing an actual amount of impact damage to a corresponding ply of a previously tested multi-ply composite structure, generate a transfer function from the plurality of weighting factors, wherein the transfer function converts each predicted damage value to a corresponding estimated damage value representing an estimated amount of damage to the ply of the multi-ply composite structure, and generate, based on the estimated damage values, a computer model defining a boundary of the estimated amount of damage to the multi-ply composite structure for display to a user, wherein the computer model comprises a parametric model having a minor axis, a major axis, and an orientation.

In one aspect, the parametric model comprises an enclosed shape.

In one aspect, the parametric model comprises an ellipse.

In one aspect, the processing circuitry is configured to generate a plurality of parametric models, each parametric model being associated with a corresponding ply of the multi-ply structure and having a minor axis, a major axis, and an orientation.

In such aspects, each parametric model defines an estimated outline of the impact damage to the corresponding ply of the multi-ply composite structure.

Additionally, in some aspects, the estimated outline of the impact damage encompasses one or more impact damage locations on the corresponding ply of the multi-ply composite structure.

In other aspects, the processing circuitry is further configured to combine each of the plurality of parametric models to generate the computer model.

In one aspect, each predicted damage value represents the predicted amount of impact damage at a location on the ply of the multi-ply composite structure. In such aspects, each actual amount of impact damage represents the actual amount of impact damage to a corresponding location on the corresponding ply of the previously tested multi-ply composite structure.

In one aspect, the computer model indicates a damage state for the multi-ply composite structure that matches, to within a predetermined variance, a damage state of the multi-ply composite structure as measured by a non-destructive evaluation (NDE) method.

In one aspect, the multi-ply composite structure comprises a portion of an aircraft.

In another aspect, the present disclosure provides a method of determining impact damage of a projectile on a multi-ply composite structure. In this aspect, the method comprises generating a plurality of weighting factors for the multi-ply composite structure, wherein each weighting factor correlates a predicted damage value representing a predicted amount of impact damage to a ply of the multi-ply composite structure to an actual damage value representing an actual amount of impact damage to a corresponding ply of a previously tested multi-ply composite structure, generating a transfer function from the plurality of weighting factors, wherein the transfer function converts each predicted damage value to a corresponding estimated damage value representing an estimated amount of damage to the ply of the multi-ply composite structure, and generating, based on the estimated damage values, a computer model defining a boundary of the estimated amount of damage to the multi-ply composite structure for display to a user, wherein the computer model comprises a parametric model having a minor axis, a major axis, and an orientation.

In one aspect, wherein the parametric model comprises an ellipse.

In one aspect, generating the computer model comprises generating a plurality of parametric models, each parametric model being associated with a corresponding ply of the multi-ply structure and having a minor axis, a major axis, and an orientation.

In one aspect, generating the plurality of parametric models comprises generating each parametric model to define an estimated outline of the impact damage to the corresponding ply of the multi-ply composite structure.

In one aspect, the estimated outline of the impact damage encompasses one or more impact damage locations on the corresponding ply of the multi-ply composite structure.

In one aspect, the method comprises combining each of the plurality of parametric models to generate the computer model.

In one aspect, each predicted damage value represents the predicted amount of impact damage at a location on the ply of the multi-ply composite structure, and each actual amount of impact damage represents the actual amount of impact damage to a corresponding location on the corresponding ply of the previously tested multi-ply composite structure.

In one aspect, the computer model indicates a damage state for the multi-ply composite structure that matches, to within a predetermined variance, a damage state of the multi-ply composite structure as measured by a non-destructive evaluation (NDE) method.

In one aspect, the method further comprises generating a visual representation of the computer model, and outputting the visual representation of the computer model to a display device for a user.

In one aspect, the present disclosure provides a non-transitory computer-readable medium comprising instructions stored thereon that, when executed by processing circuitry of a computing device, configure the computing device to generate a plurality of weighting factors for the multi-ply composite structure, wherein each weighting factor correlates a predicted damage value representing a predicted amount of impact damage to a ply of the multi-ply composite structure to an actual damage value representing an actual amount of impact damage to a corresponding ply of a previously tested multi-ply composite structure, generate a transfer function from the plurality of weighting factors, wherein the transfer function converts each predicted damage value to a corresponding estimated damage value representing an estimated amount of damage to the ply of the multi-ply composite structure, and generate, based on the estimated damage values, a computer model defining a boundary of the estimated amount of damage to the multi-ply composite structure for display to a user, wherein the computer model comprises a parametric model having a minor axis, a major axis, and an orientation.

BRIEF DESCRIPTION OF THE DRAWINGS

Aspects of the present disclosure are illustrated by way of example and are not limited by the accompanying figures with like references indicating like elements.

FIG. 8 illustrates values produced using the different FEM models and those of the actual damage states, and that are used to generate the transfer function according to aspects of the present disclosure.

DETAILED DESCRIPTION

Figure 1:
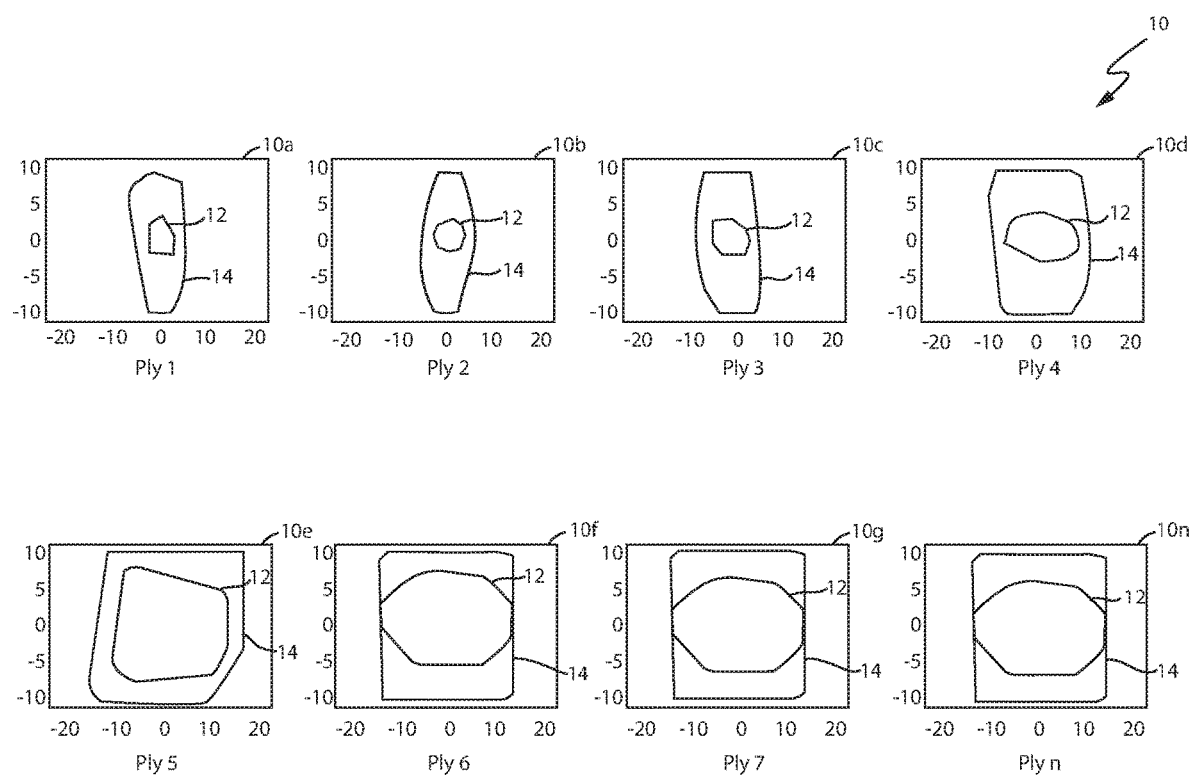
FIGS. 1-2 illustrate a comparison of the results (i.e., shapes outlining the boundaries of damage to the different plies of a multi-ply composite panel) output by different FEM models and ultrasonic inspections that produce C-Scan images.

Aspects of the present disclosure configure a computer to perform a ply-by-ply composite damage assessment and quantification of a multi-ply composite structure (e.g., a multi-ply composite panel). More particularly, a computer configured according to one or more aspects of the disclosure is configured to model the interaction of failure modes at an onset of damage (e.g., crack propagation) endued by a composite structure from an impact caused by a projectile. The computer is further configured to model the propagation of that damage after impact and before such damage is arrested due to one or more unique design features associated with the composite structure. By way of example only, a stringer on an aircraft can arrest the propagation of a crack in a fuselage structure of an airplane.

The extent of the damage is bounded by several parameters including the kinetic energy of the projectile, how that kinetic energy is converted to restored energy (i.e., "deformation response"), and dissipation of energy due to the damage (i.e., "fracture energy dissipation"). In the case of multi-ply composite structures, the interaction of intra-ply and interplay damage propagation also contribute to various failures modes. Such modes include, but may not be limited to, fiber failure, matrix shear failure, and delamination, and can contribute to the overall damage experienced by a composite laminate structure. Such failures are generally visible in post-impact testing, but the ply-by-ply damage is generally not visible. Conventionally, such ply-by-ply damage can only be characterized thru a non-destructive evaluation (NDE) method. However, the data and information characterizing such ply-by-ply damage to a multi-ply composite structure is critical as it forms a basis for analytical methods of verification and validation.

In more detail, according to the present disclosure, analyses are performed on a composite panel of interest using a plurality of finite element method (FEM) models. The computer is configured to generate weighting factors (also referred to herein as "correlation factors") that correlate the results of those analyses to the results of other analyses performed on a corresponding composite panel using one or more non-destructive evaluation (NDE) methods.

In at least one aspect, the weighting factors are generated automatically. The weighting factors are then used to cross-validate the various different FEM results, as well as convert the plurality of FEM results into a "best fit" damage prediction. Such "best fit" predictions are graphically displayed to users as a computer model. Particularly, in one aspect, the generated model comprises a shape (e.g., an ellipse) that defines the boundary of a damaged area on the multi-ply composite panel. In addition, using well-established, predetermined metrics, the developed weighting factors also form the basis for assessing one or more different analysis methods in order to determine the criteria for success. That is, in addition to the other functions described herein, the weighting factors can utilize a set of predetermined values to determine whether a given method (e.g., a given FEM model) used to analyze a given multi-ply composite panel would or would not yield sufficiently accurate results. Thus, using aspects of the present disclosure, it is possible to identify certain FEM models that are particularly accurate for a certain set of materials, a certain number of plies, or the like.

The present aspects can be implemented, for example, by a computer executing MATLAB. In such implementations, aspects of the disclosure automatically generate the weighting factors, and subsequently utilize those factors to quantitatively and systematically compare post-impact simulation outputs obtained from the various FEM models. As seen in more detail later, the generated weighting factors are utilized to develop transfer function(s) used to convert the multiple values output by the FEM models into the "best fit" prediction of the damage that could be done to a multi-ply composite panel of interest. The "best fit" estimate defines a bounded area of the multi-ply composite panel that would be damaged, and that is closest in size and shape to an area of damage that would have been actually measured using non-destructive evaluation methods.

As seen in more detail below, the operation of a computer configured according to the present disclosure is enhanced when compared to the functioning of a computer configured to utilize a conventional evaluation process. For example, a computer configured according to the present aspects produces results that are significantly more accurate than those produced by conventional methods. Additionally, a computer configured according to the present aspects requires less time to produce these more accurate results, and further, reduces the many lines of post impact FEM output into only three parameters that are much easier to handle. These parameters are:

- a first parameter defining a length of a major axis $2M_i$ of the ellipse shape outlining a damaged area at each two adjacent ply interfaces i and i+1 of a composite panel, wherein ($2M_{i=1, nply-1}$) (with $n_{ply}$=the number of plies in the laminate);
- a second parameter defining a length of a minor axis $2m_i$ of the ellipse shape at outlining a damaged area at each two neighboring ply interfaces i and i+1 of a composite panel, wherein ($2M_{i=1, nply-1}$); and
- a third parameter defining the orientation $\theta_i$, in degrees, of the ellipse shape outlining a damaged area at each two adjacent ply interfaces i and i+1 of a composite panel wherein ($\theta_{i=1, nply-1}$).

Moreover, a computer configured to operate according to the present aspects generates a computer model graphically illustrating the results of the analysis to a user. Because the users view the generated computer model, the users are able to quickly and easily visually compare the estimated damage area to areas of damage actually done to a composite panel.

Turning now to the drawings, FIG. 1 illustrates graphs 10a-10n (collectively, graphs 10) comparing the output results of a first FEM model (FEM-1) to the output results of one or more ultrasonic inspections that produce C-Scan images. In particular, each graph 10a-10n represents a predicted damage area on a different ply of a multi-ply composite panel. Each graph 10 also includes a pair of boundaries 12, 14 defining respective bounded areas of damage to the ply. In FIG. 1, the first boundary 12 defines an actual area of damage associated with C-Scan results, and the second boundary 14 defines the predicted area of damage associated with the results of FEM-1.

Figure 2:
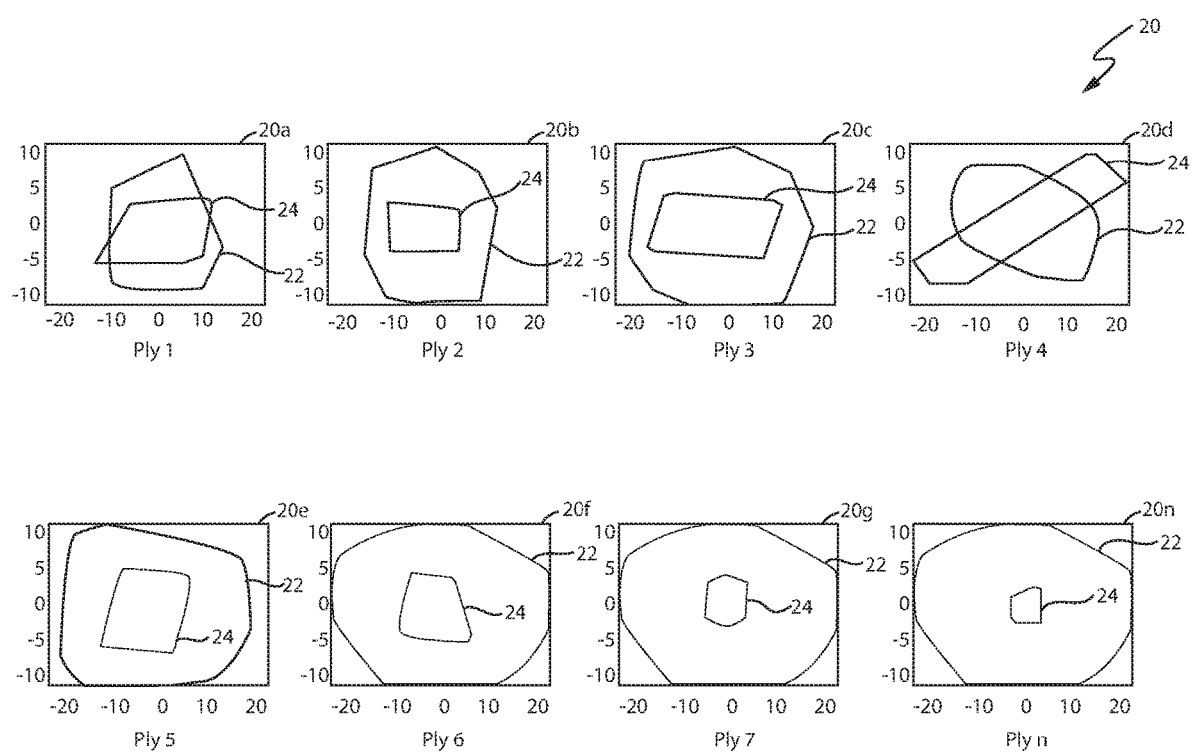

FIG. 2 illustrates another set of graphs 20a-20n (collectively, graphs 20) comparing the output results of a second, different FEM model (FEM-2) to C-Scan images produced by the same, or different, ultrasonic inspections of the composite panel. In FIG. 2, a third boundary 22 defines the actual area of damage associated with the C-Scan results, while the fourth boundary 24 defines the predicted area of damage associated with the results of FEM-2.

As seen in FIG. 1, the lines indicating the first and second boundaries 12, 14 are not coextensive. That is, for any given graph 10, the actual area of damage marked by the first boundary 12 is substantially dissimilar from the predicted area of damage marked by boundary 14 in the same graph 10. In other words, the difference between the sizes of these two areas are not within a predetermined threshold value. Similarly, the lines indicating the third and fourth boundaries 22, 24 in FIG. 2 are also not coextensive. This is because the numerical values on which boundaries 12, 14 and 22, 24 are based have not been processed according to aspects of the present disclosure. Rather, the boundaries 12, 14 and 22, 24 represent the unprocessed values associated with the different FEM models and ultrasonic inspections.

Aspects of the present disclosure, however, enhance the functioning of a computer by configuring the computer to process these values such that the areas indicated by their respective boundaries are substantially coextensive. That is, the sizes of the areas marked by respective boundaries are within the predetermined threshold value.

Figure 3A:
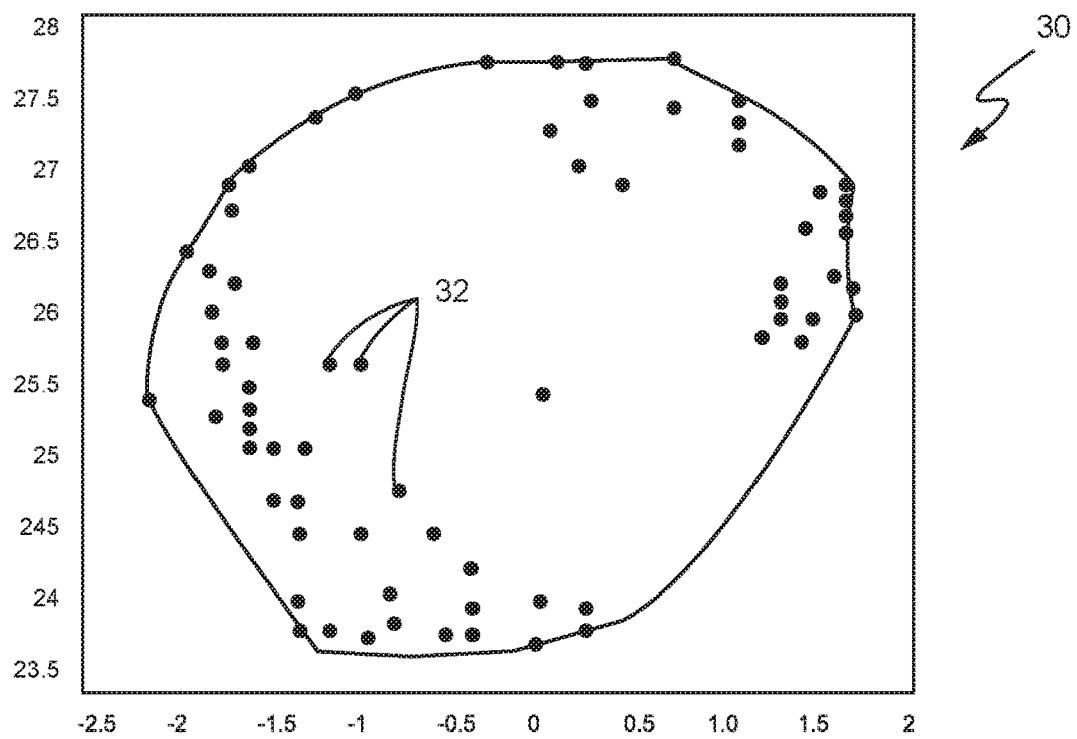
FIGS. 3A-3B illustrates a process of converting the output of one or more FEM models to a damage outline (i.e., a shape such as an ellipse identifying the boundary of damage to a composite multi-ply panel) according to one aspect of the present disclosure.
Figure 3B:
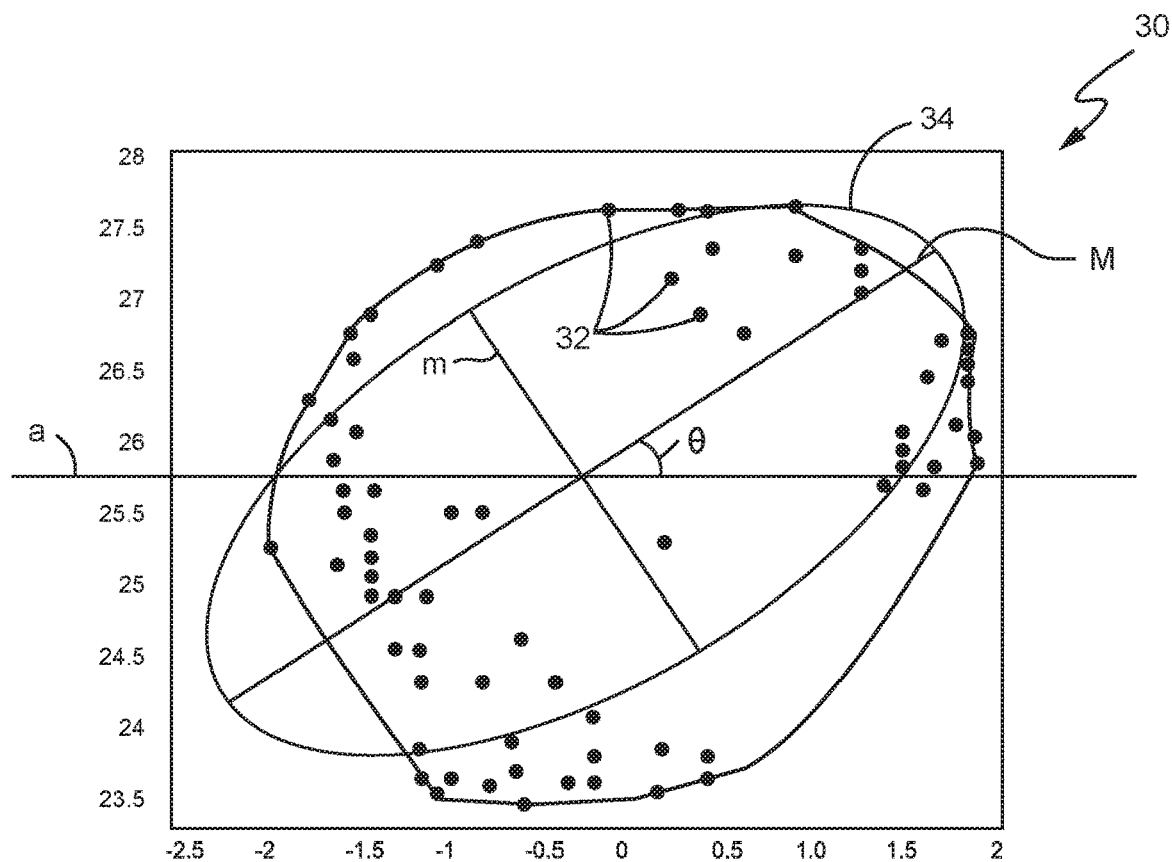

One such aspect, for example, is shown in FIGS. 3A-3B. These figures graphically illustrate the conversion of the unprocessed predicted damage values output by one or more FEM models to a corresponding number of estimated damage values for the multi-ply composite panel.

In more detail, this aspect of the present disclosure generates weighting factors correlating the predicted damage values output by the one or more FEM models (e.g., FEM-1, FEM-2 . . . FEM-n) to the values associated with the C-Scan images. In the context of the present disclosure, weighting factors C are calculated from the linear regression between input parameters and corresponding outputs. In this case, the input parameters are the semi-major axes determined from each of a plurality of FEM models (e.g., FEM-1, FEM-2 . . . FEM-n), the semi-minor axes determined from each of the FEM models, and the orientations determined from each of the plurality of FEM models at each two neighboring ply interfaces. The corresponding outputs are the semi-major axes from each of a plurality of C-scan images, the semi-minor axes from each of the plurality of C-scan images, and the orientation from each of the plurality of C-scan images at each two neighboring ply interfaces.

In one aspect, each output parameter is approximated for each FEM model (e.g., FEM-1 . . . FEM-n) using the following general equation:

$$OutputParameter_{ESTi=1,nply-1} = \sum_{j=1}^{n_{FEM}} C_{ij}D_{ij} + R_i \qquad (1)$$

where:

OutputParamater$_{ESTi=1,nply-1}$ is one of:

$M_{FEM-i,j}$—the length the semi-major axis of a given finite element model FEM-i (i=1, $n_{FEM}$) calculated for the damage region at ply interface i and j+1;

$m_{FEM-i,j}$—the length of the semi-minor axis of a given finite element model FEM-i (1=1, $_{nFEM}$) calculated for the damage region at ply interface i and 1+1; or $\theta_{FEM-i,j}$—the orientation in radians of a given finite element model FEM-i (1=1, $n_{FEM}$) calculated for the damage region at ply interface j and j+1.

$C_{i,j}$ is a weighting factor (i.e., a dimensionless value) calculated to the "best fit" FEM-j with respect to damage scan data associated with the damage at the interface between two adjacent plies i and i+1;

$D_{ij}$ is the associated FEM-j input damage parameter at an interface between two adjacent plies i and i+1;

$R_i$ is the residual value as a difference between the weighted input and predicted output (i.e., the actual scanned damage data compared to damage estimated by the finite element models FEM-i (i=−1, $n_{FEM}$) evaluated at two adjacent ply interfaces i and i+1).

In FIGS. 3A-3B, the estimated damage outline values are generated using a logic function that connects the outermost points within a selected cluster. As seen in FIGS. 3A-3B, such points are plotted in graph 30 as points 32. Then, based on the estimated damage outline values, the computer generates a computer model defining a boundary 34 outlining the area of estimated damage on the multi-ply composite panel, and outputs the computer model to a display for a user. The boundary 34 can be represented using any shape desired; however, in this aspect, the boundary 34 is represented as an ellipse, and thus, the computer model is generated to comprise a parametric model defined by a major axis M, a minor axis m, and an orientation θ defining an angle of orientation from an axis of rotation a. As described previously with respect to FIG. 3B, the elliptical parametric model defining boundary 34 is a "best fit" to the estimated damage values defined by points 32.

Figure 4:
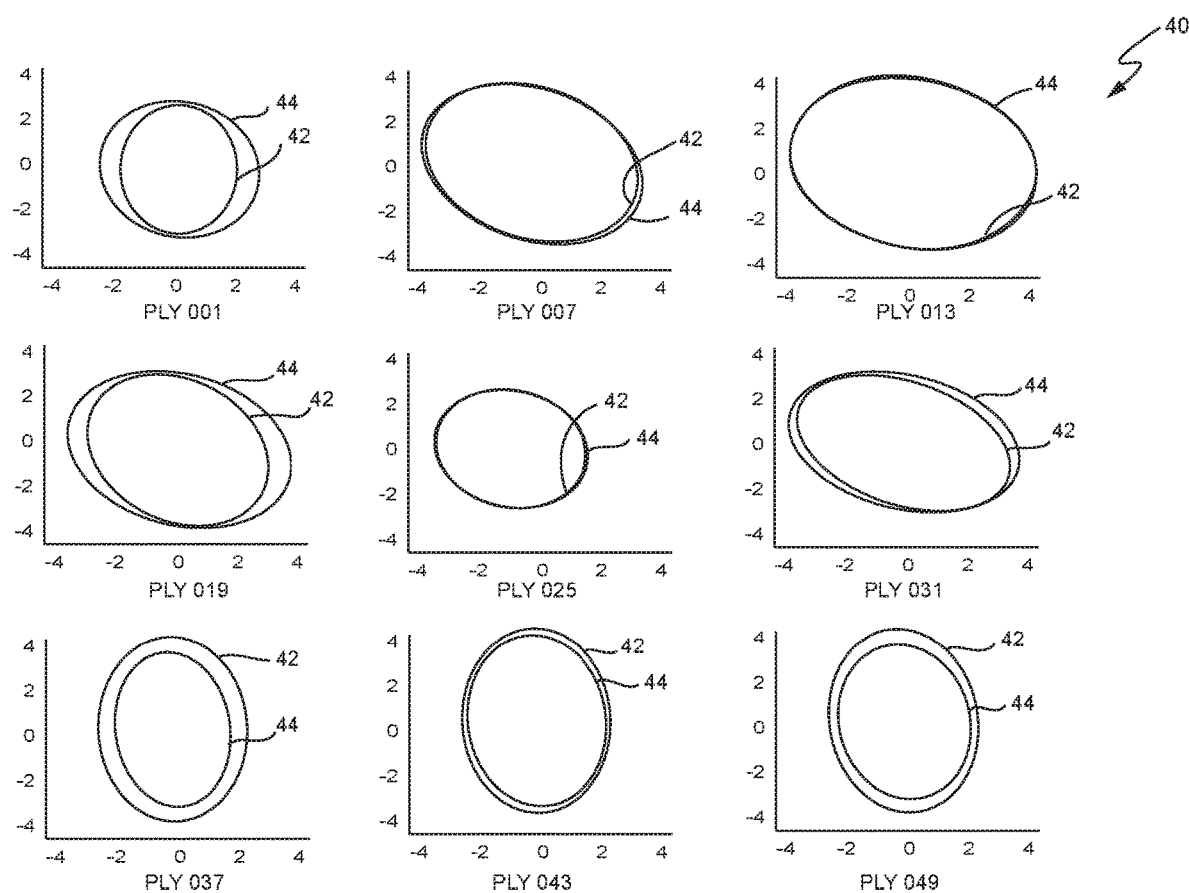
FIG. 4 illustrates a ply-by-ply comparison of the damage outlines as shown on C-Scan images produced using ultrasonic inspections, and the estimated damage outlines that were predicted according to aspects of the present disclosure.

FIG. 4 illustrates graphs 40 for selected plies of a composite structure comparing the results of processing the predicted damage values output by the FEM models according to the weighting factors, as described above, to the results of the C-Scan images. As seen in FIG. 4, a boundary 44 defines an area of estimated damage to a given ply of the multi-ply composite panel. Boundary 42 defines an area of actual damage to a given ply of a previously tested multi-ply composite panel having physical characteristics that are the same, or substantially similar to, the multi-ply composite panel currently being analyzed. In each case, the areas defined by their respective boundaries 42, 44 are either the same, or substantially coextensive (i.e., the respective sizes of the areas covered indicated by boundaries 42, 44 are within the predetermined threshold value such as ±1%). This illustrates that aspects of the present disclosure enhance the functioning of a computer to produce results that are far more accurate than those that are output using conventional methods.

Figure 5:
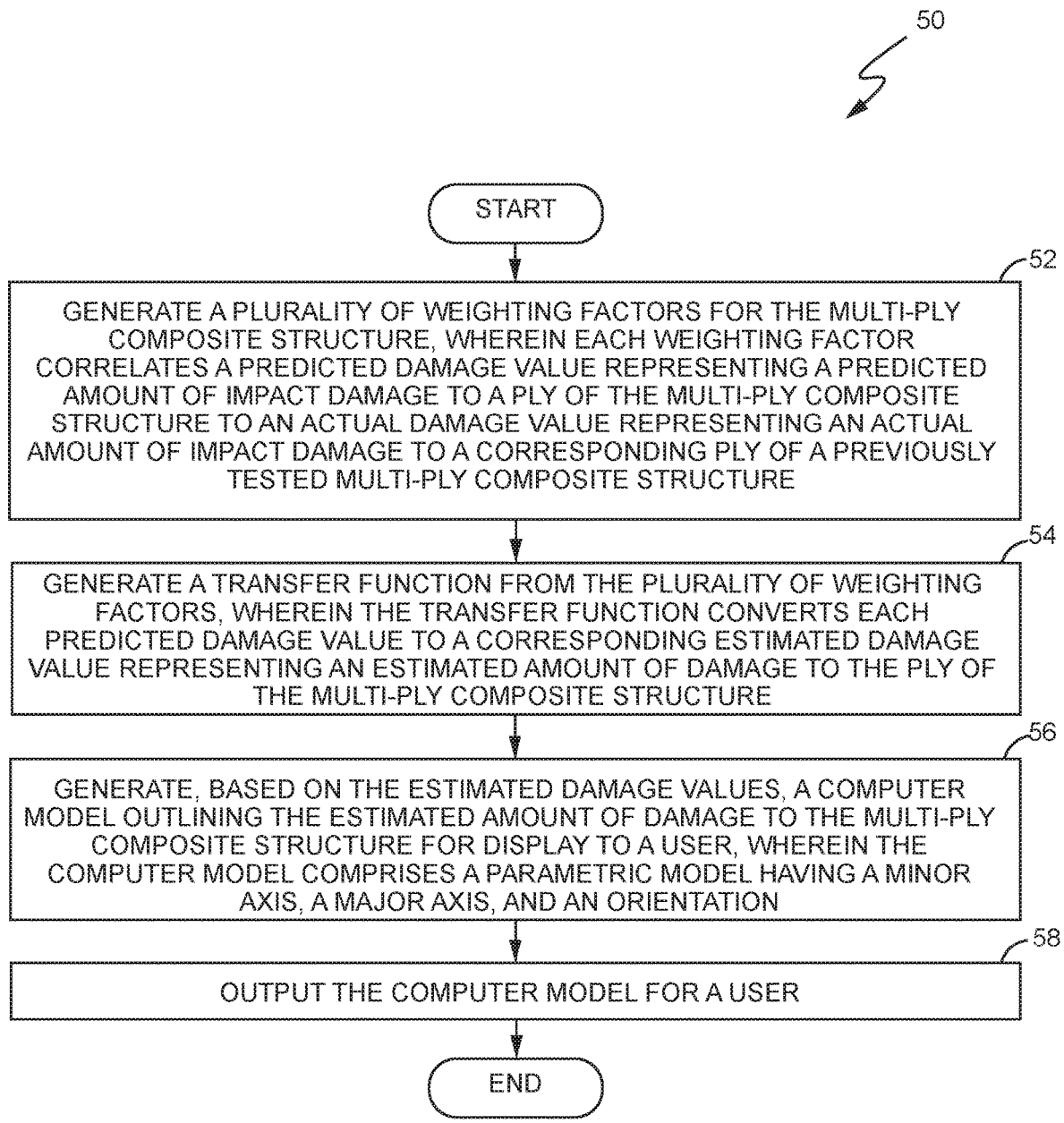
FIGS. 5-6 are flow diagrams illustrating methods for predicting the damage state of a multi-ply composite panel according to aspects of the present disclosure.
Figure 6:
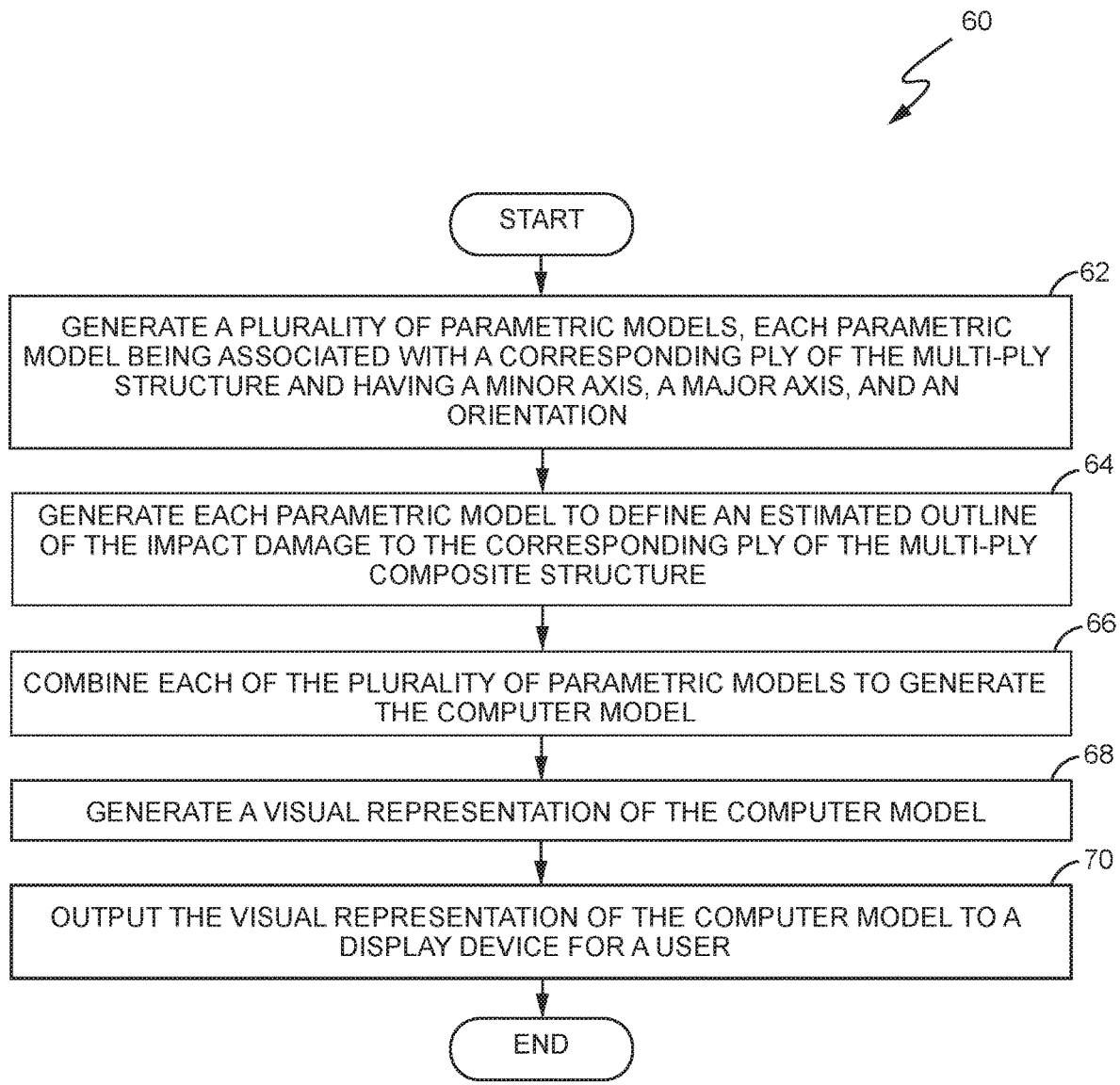

FIGS. 5-6 are flow diagrams illustrating methods for predicting the damage state of a multi-ply composite panel according to aspects of the present disclosure. Particularly, FIG. 5 illustrates method 50, which is implemented on a processing circuit of a computing device, and begins with generating a plurality of weighting factors for the multi-ply composite panel (box 52). As previously stated, each weighting factor correlates a predicted damage value representing a predicted amount of impact damage to a ply of the multi-ply composite panel to an actual damage value representing an actual amount of impact damage to a corresponding ply of a previously tested multi-ply composite panel. Method 50 then continues with generating a transfer function from the plurality of weighting factors (box 54). The transfer function converts each predicted damage value to a corresponding estimated damage value that represent an estimated amount of damage to the ply of the multi-ply composite panel. Then, based on the estimated damage values, method 50 generates a computer model defining a boundary of the estimated amount of damage to the multi-ply composite panel for display to a user (box 56). While no particular shape is required, this aspect of the disclosure generates the computer model to comprise an ellipse having a minor axis m, a major axis M, and an orientation θ. The model is then output to a display for a user (box 58) so that the user can easily and quickly compare estimated damage areas on each individual ply (as well as to the panel as a whole) to corresponding areas of actual damage on a previously tested multi-ply composite panel.

FIG. 6 illustrates a method 60 for generating a visual representation of the computer model for output to the user, and begins with the computer generating a plurality of parametric models, such as a plurality of ellipses (box 62). Each parametric model that is generated is associated with a corresponding ply of the multi-ply structure and has a minor axis m, a major axis M, and an orientation θ. Additionally, each parametric model is generated to define an outline of the damaged area on the ply (box 64), and thus, defines the bounds the damaged area. By way of example, boundary 34 illustrated in FIG. 3B, which in this aspect comprises an ellipse, defines the boundary of a damaged area. The plurality of generated parametric models is then combined to generate the computer model (box 66), and a visual representation of the computer model is generated (box 68) and output to a display device for a user (box 70).

Figure 7:
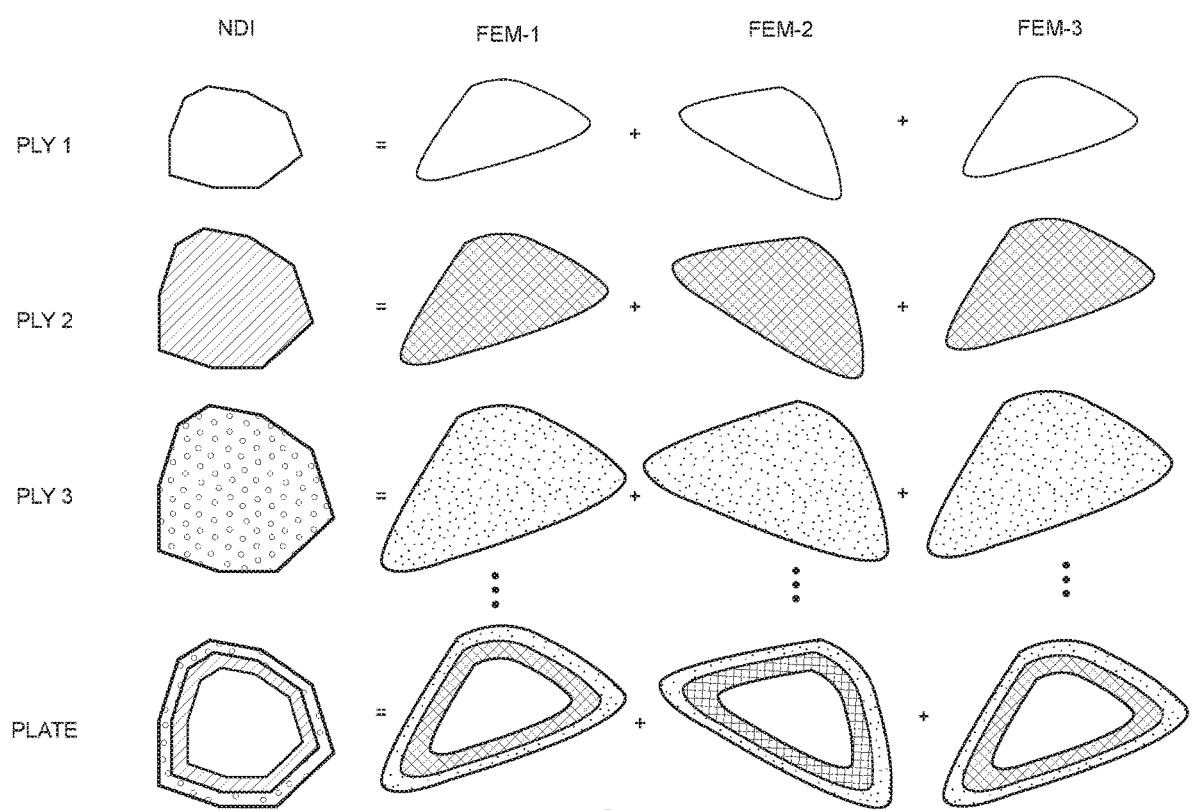
FIG. 7 graphically illustrates the generation of a transfer function between the various outputs of multiple FEM models and actual damage states according to aspects of the present disclosure.

FIG. 7 graphically illustrates the generation of a transfer function utilized to convert each predicted damage value output by three different FEM models (i.e., FEM-1, FEM-2, and FEM-3) to a corresponding estimated damage value according to aspects of the present disclosure. In the context of the present aspects, a transfer function is defined as a series of multipliers comprising $C_1$ through $C_n$ (e.g., such as $C_1$ through $C_6$ seen above). According to the present disclosure, the best estimate for a damage profile can be obtained by a series of FEM input parameters multiplied by the transfer function, and as illustrated in FIG. 7, substantially matches a damage profile identified via non-destructive inspection (NDI).

FIG. 8 illustrates a table 90 showing both the model input values 92 and the model output values 94 that are used to generate a parametric model (e.g., an ellipse) for each ply of a multi-ply composite panel. More particularly, the model input values 92 comprise the results of a plurality of FEM models (e.g., FEM-1, FEM-2). For each ply, the FEM model outputs a major axis M, a minor axis m, and an orientation θ. The computer takes these model input values 92 and generates the model output values 94 that are utilized to generate the parametric models for each ply. As seen in this aspect, the computer generates the model output values 94 to comprise a single combination of a major axis M, minor axis m, and orientation θ for each individual ply. So generated, the model output values 94 are utilized by the computer to generate each parametric model.

Figure 9:
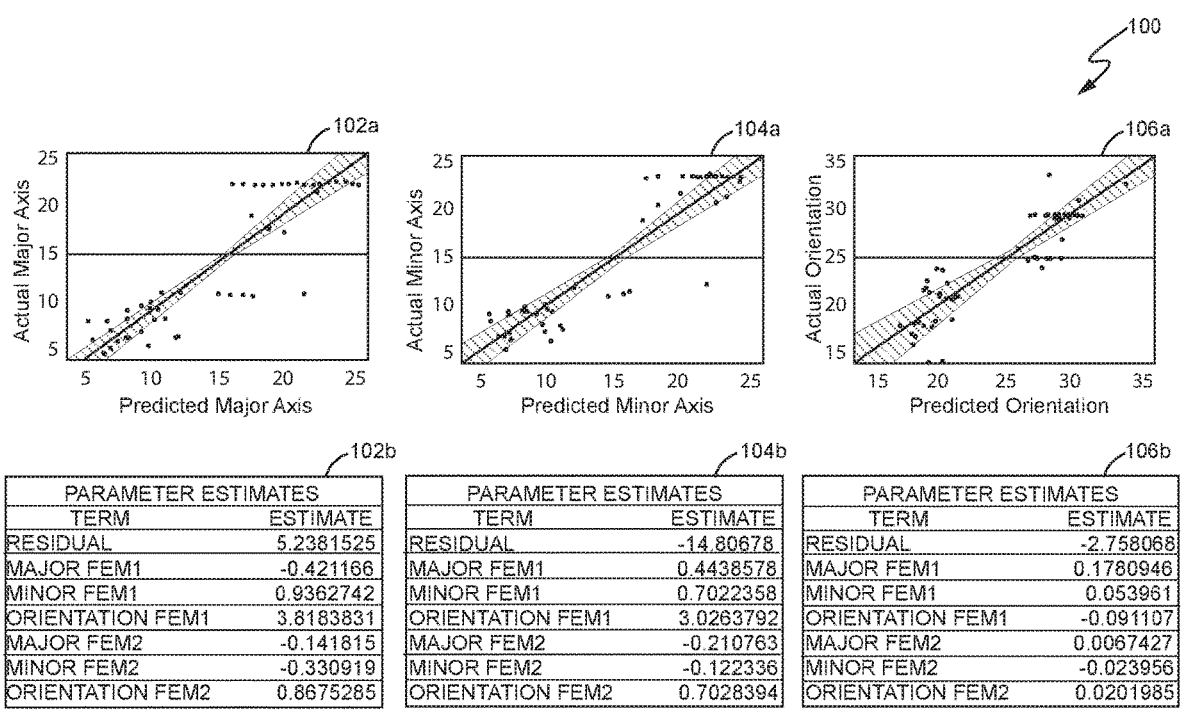
FIG. 9 illustrates values used to generate a computer model defining a boundary of the estimated amount of damage to a multi-ply composite structure for display to a user according to aspects of the present disclosure.

FIG. 9 illustrates a series of graphs 100 plotting the model output values 94 against values representing actual damage. Particularly, graph 102*a* illustrates the model output values 94 comprising the major axis M, as well as a table 102*b* showing the corresponding model input values 92 for a given ply. Similarly, graph 104*a* illustrates the model output values 94 comprising the minor axis m, as well as a table 104*b* showing the corresponding model input values 92 for a given ply, and graph 106*a* illustrates the model output values 94 comprising the orientation θ of the parametric model, as well as a table 102*b* showing the corresponding model input values 92 (orientation θ) for the given ply. As previously stated, the model input values 92 seen in tables 102*b*, 104*b*, 106*b* are utilized by the computer to generate corresponding model output values 94, which in turn, are plotted against the actual damage values seen in graphs 102*a*, 104*a*, 106*a*, respectively.

Figure 10:
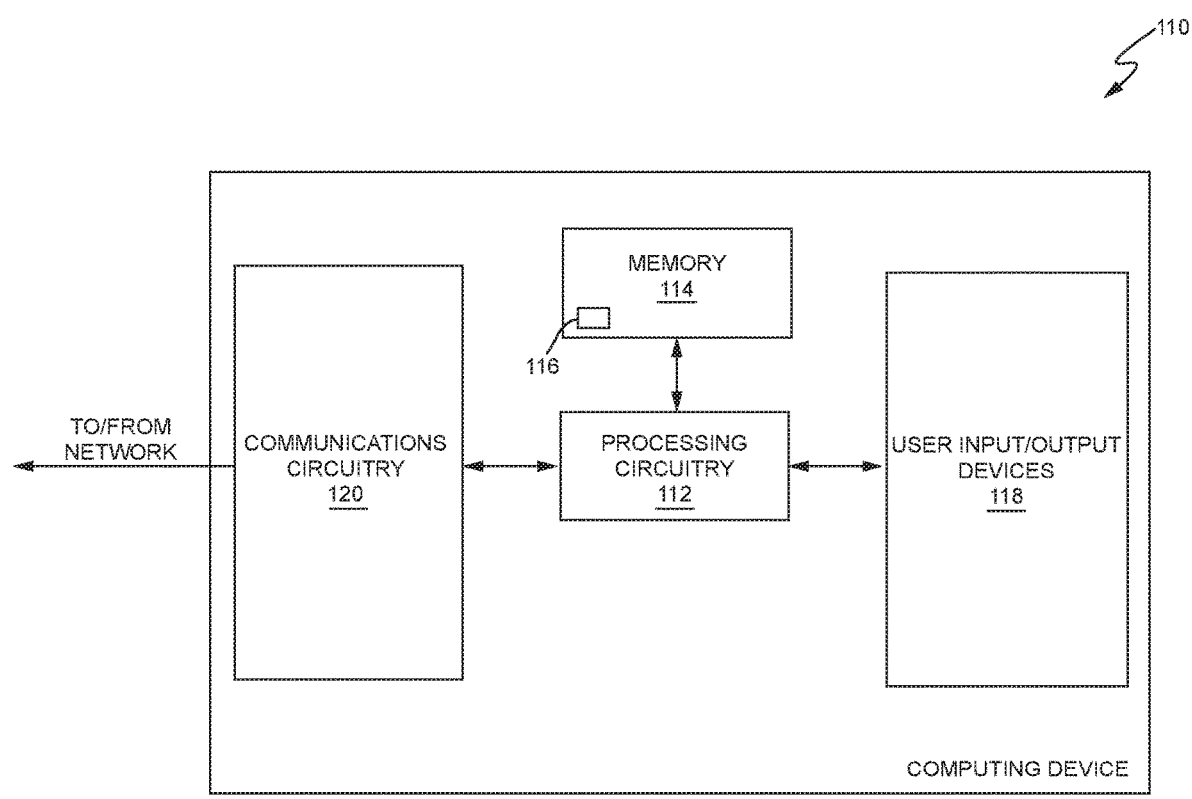
FIG. 10 is a schematic block diagram illustrating some components of a computing device configured to function according to one aspect of the present disclosure.

FIG. 10 is a schematic block diagram illustrating some components of a computing device 110 configured to generate a computer model as previously described. In particular, computing device 110 comprises processing circuitry 112 communicatively coupled to a memory 114 that stores one or more control programs 116, one or more user input/output devices 118 (e.g., a keyboard, a mouse, one or more display devices, etc.), and communication circuitry 120.

According to various aspects of the present disclosure, processing circuity 112 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one such aspect, processing circuitry 112 includes programmable hardware capable of executing software instructions stored, e.g., as a machine-readable computer control program 116 in memory 114.

More particularly, processing circuitry 112 is configured to execute control program 116 to generate a plurality of weighting factors for the multi-ply composite panel, wherein each weighting factor correlates a predicted damage value representing a predicted amount of impact damage to a ply of the multi-ply composite panel to an actual damage value representing an actual amount of impact damage to a corresponding ply of a previously tested multi-ply composite panel, generate a transfer function from the plurality of weighting factors, wherein the transfer function converts each predicted damage value to a corresponding estimated damage value representing an estimated amount of damage to the ply of the multi-ply composite panel, and generate, based on the estimated damage values, a computer model defining a boundary of the estimated amount of damage to the multi-ply composite panel for display to a user, wherein the computer model comprises a parametric model having a minor axis, a major axis, and an orientation, as previously described.

Memory 114 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination. As seen in FIG. 10, memory 114 comprises circuitry configured to store control program 116.

The User Input/Output (I/O) devices 118 comprise any device known in the art that allow a user to interact with the computing device 110. Such devices can include, but are not limited to, microphones, display devices (such as a Liquid Crystal Display (LCD) and/or a Light Emitting Diode (LED) display for presenting visual information to a user), keyboards, a pointer device, such as a mouse, and the like. In accordance with the present disclosure, the computer models that are generated according to the present aspects are output by processing circuitry 112 to a display device. Thus, users are able to quickly and easily visually compare estimated damage areas to areas of damage actually done to a composite panel, as previously described.

Communications circuitry 120 comprises circuitry configured to control the input and output (I/O) data paths of the computing device 110. The I/O data paths include data paths for exchanging signals with other computers and mass storage devices over a communications network (not shown). Such signals include, but are not limited to, those that are needed to generate the weighting factors, transfer functions, and computer models, as previously described. Such storage locations include, for example, databases. In some aspects, communications circuitry 120 comprises an ETHERNET card configured to communicate signals and data with one or more remote devices via one or more communications networks (not shown).

Figure 11:
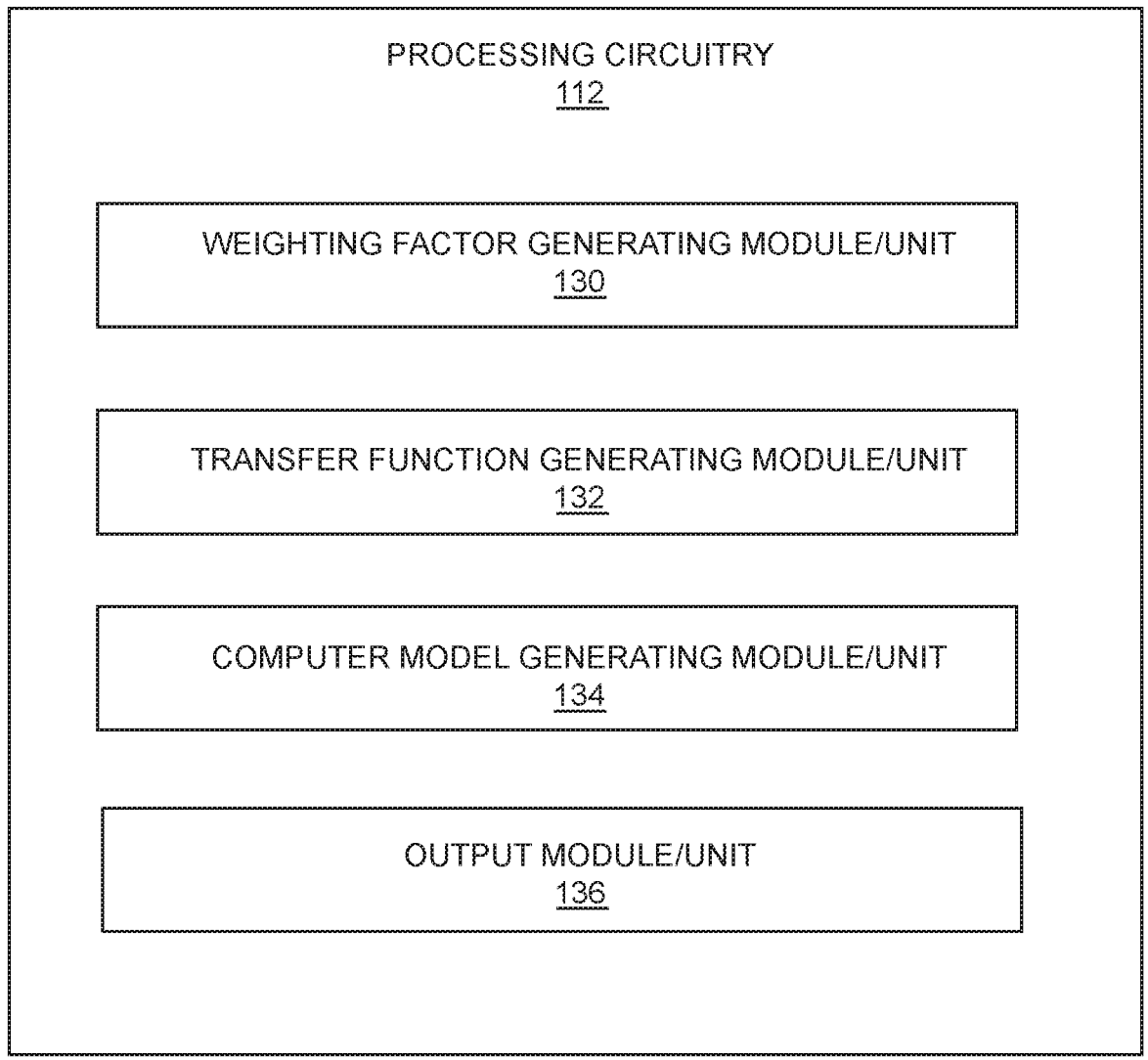
FIG. 11 is a block diagram illustrating example processing circuitry according to one or more aspects of the present disclosure.

FIG. 11 is a schematic block diagram illustrating processing circuitry 112 implemented according to different hardware units and software modules (e.g., as control program 116 stored in memory 114) according to one aspect of the present disclosure. As seen in FIG. 11, processing circuitry 112 implements a weighting factor generating module/unit 130, a transfer function generating module/unit 132, a computer model generating unit/module 134, and an output module/unit 136.

The weighting factor generating module/unit 130 is configured to generate the weighting factors that correlate predicted damage values representing predicted amounts of damage to the plies to actual damage values representing actual amounts of damage to corresponding plies of a previously tested multi-ply composite panel, as previously described. The transfer function generating module/unit 132 is configured to generate the transfer function from the plurality of weighting factors generated by the weighting factor module/unit 130. The computer model generating unit/module 134 is configured to generate a computer model defining a boundary of the estimated amount of damage to the multi-ply composite panel. As previously stated, this includes generating each of the plurality of parametric models—each being generated to comprise a major axis M, a minor axis m, and an orientation θ. The output module/unit 138 is configured to output the generated computer model to a display device for the user.

Figure 12:
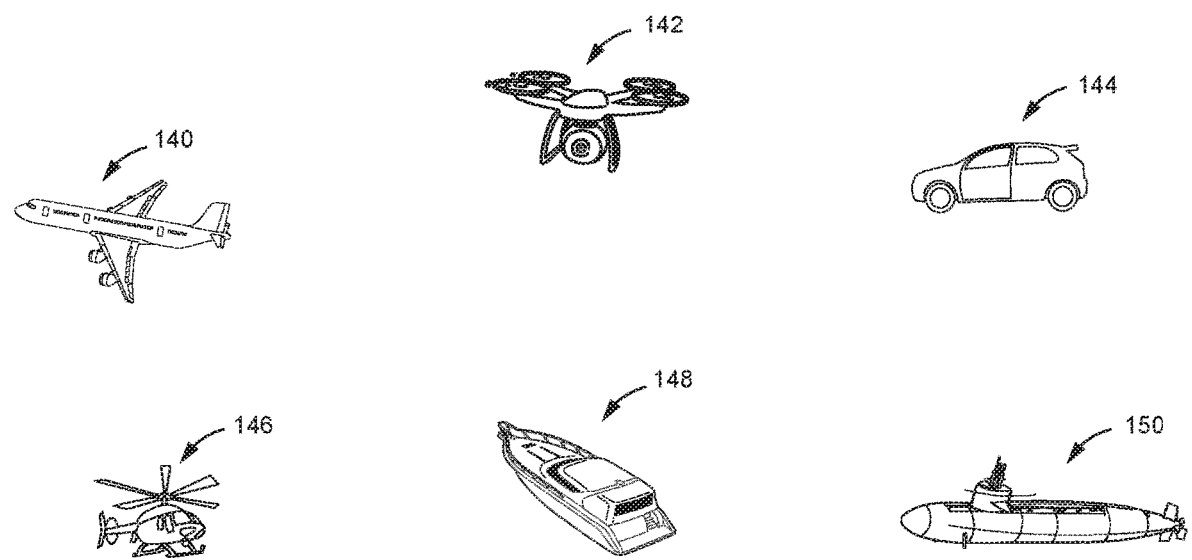
FIG. 12 illustrates some example vehicles comprising multi-ply composite structures suitable for use with aspects of the present disclosure.

It should be noted that the previous aspects describe the present disclosure in the context of a multi-ply composite panel. However, this is for illustrative purposes only. Aspects of the present disclosure are equally as suitable for use in connection with other types of multi-ply composite structures. As seen in FIG. 12, for example, such multi-ply composite structures include, but are not limited to, those used on aircraft 140, unmanned and/or remotely controlled aircraft 142, automobiles that utilize fossil fuels 144, rotorcraft 146 such as helicopters, surface craft 148 such as boats, and submersible craft 150 such as submarines.

Aspects of the present disclosure further include various methods and processes, as described herein, implemented using various hardware configurations configured in ways that vary in certain details from the broad descriptions given above. For instance, one or more of the processing functionalities discussed above may be implemented using dedicated hardware, rather than a microprocessor configured with program instructions, depending on, e.g., the design and cost tradeoffs for the various approaches, and/or system-level requirements.

Thus, the foregoing description and the accompanying drawings represent non-limiting examples of the methods and apparatus taught herein. As such, the aspects of the present disclosure are not limited by the foregoing description and accompanying drawings. Instead, the aspects of the present disclosure are limited only by the following claims and their legal equivalents.

What is claimed is:

1. A computer configured to determine impact damage of a projectile on a multi-ply composite structure, the computer comprising:
   a communication interface circuit configured to communicate data via a communications network; and
   processing circuitry operatively connected to the communication interface circuit and configured to:
   generate a plurality of weighting factors for the multi-ply composite structure, wherein each weighting factor correlates a predicted damage value representing a predicted amount of impact damage to a ply of the multi-ply composite structure to an actual damage value representing an actual amount of impact damage to a corresponding ply of a previously tested multi-ply composite structure;
   generate a transfer function from the plurality of weighting factors, wherein the transfer function converts each predicted damage value to a corresponding estimated damage value representing an estimated amount of damage to the ply of the multi-ply composite structure; and
   generate, based on the estimated damage values, a computer model defining a boundary of the estimated amount of damage to the multi-ply composite structure for display to a user, wherein the computer model comprises a parametric model having a minor axis, a major axis, and an orientation.

2. The computer of claim 1 wherein the parametric model comprises an enclosed shape.

3. The computer of claim 2 wherein the parametric model comprises an ellipse.

4. The computer of claim 1 wherein to generate the computer model, the processing circuitry is configured to generate a plurality of parametric models, each parametric model being associated with a corresponding ply of the multi-ply composite structure and having a minor axis, a major axis, and an orientation.

5. The computer of claim 4 wherein each parametric model defines an estimated outline of the impact damage to the corresponding ply of the multi-ply composite structure.

6. The computer of claim 5 wherein the estimated outline of the impact damage encompasses one or more impact damage locations on the corresponding ply of the multi-ply composite structure.

7. The computer of claim 4 wherein the processing circuitry is further configured to combine each of the plurality of parametric models to generate the computer model.

8. The computer of claim 1 wherein each predicted damage value represents the predicted amount of impact damage at a location on the ply of the multi-ply composite structure, and wherein each actual amount of impact damage represents the actual amount of impact damage to a corresponding location on the corresponding ply of the previously tested multi-ply composite structure.

9. The computer of claim 1 wherein the computer model indicates a damage state for the multi-ply composite structure that matches, to within a predetermined variance, a damage state of the multi-ply composite structure as measured by a non-destructive evaluation (NDE) method.

10. The computer of claim 1 wherein the multi-ply composite structure comprises a portion of an aircraft.

11. A method of determining impact damage of a projectile on a multi-ply composite structure, the method comprising:
    generating a plurality of weighting factors for the multi-ply composite structure, wherein each weighting factor correlates a predicted damage value representing a predicted amount of impact damage to a ply of the multi-ply composite structure to an actual damage value representing an actual amount of impact damage to a corresponding ply of a previously tested multi-ply composite structure;
    generating a transfer function from the plurality of weighting factors, wherein the transfer function converts each predicted damage value to a corresponding estimated damage value representing an estimated amount of damage to the ply of the multi-ply composite structure; and
    generating, based on the estimated damage values, a computer model defining a boundary of the estimated amount of damage to the multi-ply composite structure for display to a user, wherein the computer model comprises a parametric model having a minor axis, a major axis, and an orientation.

12. The method of claim 11 wherein the parametric model comprises an ellipse.

13. The method of claim 11 wherein to generating the computer model comprises generating a plurality of parametric models, each parametric model being associated with a corresponding ply of the multi-ply composite structure and having a minor axis, a major axis, and an orientation.

14. The method of claim 13 wherein generating the plurality of parametric models comprises generating each parametric model to define an estimated outline of the impact damage to the corresponding ply of the multi-ply composite structure.

15. The method of claim 14 wherein the estimated outline of the impact damage encompasses one or more impact damage locations on the corresponding ply of the multi-ply composite structure.

16. The method of claim 13 further comprising combining each of the plurality of parametric models to generate the computer model.

17. The method of claim 11 wherein each predicted damage value represents the predicted amount of impact damage at a location on the ply of the multi-ply composite structure, and wherein each actual amount of impact damage represents the actual amount of impact damage to a corresponding location on the corresponding ply of the previously tested multi-ply composite structure.

18. The method of claim 11 wherein the computer model indicates a damage state for the multi-ply composite structure that matches, to within a predetermined variance, a damage state of the multi-ply composite structure as measured by a non-destructive evaluation (NDE) method.

19. The method of claim 11 further comprising:
generating a visual representation of the computer model; and
outputting the visual representation of the computer model to a display device for a user.

20. A non-transitory computer-readable medium comprising instructions stored thereon that, when executed by processing circuitry of a computing device, configure the computing device to:
generate a plurality of weighting factors for a multi-ply composite structure, wherein each weighting factor correlates a predicted damage value representing a predicted amount of impact damage to a ply of the multi-ply composite structure to an actual damage value representing an actual amount of impact damage to a corresponding ply of a previously tested multi-ply composite structure;
generate a transfer function from the plurality of weighting factors, wherein the transfer function converts each predicted damage value to a corresponding estimated damage value representing an estimated amount of damage to the ply of the multi-ply composite structure; and
generate, based on the estimated damage values, a computer model defining a boundary of the estimated amount of damage to the multi-ply composite structure for display to a user, wherein the computer model comprises a parametric model having a minor axis, a major axis, and an orientation.

* * * * *